United States Patent
Cress

(10) Patent No.: US 9,568,622 B2
(45) Date of Patent: Feb. 14, 2017

(54) NEUTRON DETECTOR USING GD-BASED SCINTILLATOR AND WIDE-BANDGAP SEMICONDUCTOR PHOTOVOLTAIC

(71) Applicant: Cory D. Cress, Alexandria, VA (US)

(72) Inventor: Cory D. Cress, Alexandria, VA (US)

(73) Assignee: The United States of America, as represented by the Secretary of the Navy, Washnigton, DC (US)

(*) Notice: Subject to any disclaimer, the term of this patent is extended or adjusted under 35 U.S.C. 154(b) by 14 days.

(21) Appl. No.: 14/186,003

(22) Filed: Feb. 21, 2014

(65) Prior Publication Data

US 2014/0264057 A1    Sep. 18, 2014

Related U.S. Application Data

(60) Provisional application No. 61/778,923, filed on Mar. 13, 2013.

(51) Int. Cl.
*G01T 3/06* (2006.01)
*G01T 3/08* (2006.01)

(52) U.S. Cl.
CPC .  *G01T 3/06* (2013.01); *G01T 3/08* (2013.01); *G01T 3/085* (2013.01)

(58) Field of Classification Search
CPC .............. G01T 3/06; G01T 3/08; G01T 3/085
See application file for complete search history.

(56) References Cited

U.S. PATENT DOCUMENTS

| 7,755,054 | B1 |   | 7/2010 | Shah et al. |
| 8,153,983 | B1 | * | 4/2012 | Shah ................ G01T 1/202 250/361 R |
| 2010/0223010 | A1 | * | 9/2010 | Nikitin et al. ............... 702/8 |
| 2012/0286166 | A1 | * | 11/2012 | Osinski et al. .......... 250/390.11 |
| 2012/0326043 | A1 | * | 12/2012 | Duraj ......................... 250/362 |
| 2013/0075600 | A1 | * | 3/2013 | Nikitin ................ G01V 5/107 250/269.4 |

OTHER PUBLICATIONS

Cory Cress, "Effects of ionizing radiation on nanomaterials and III-V semiconductor devices" May 1, 2008, Rochester Institute of Technology, RIT scholar works, 170 pages.*
Rivera et al. "Detection of thermal neutrons using gadolinium-oxide-based nanocrystals", Jun. 3, 2011, SPIE vol. 8018, 12 pp., doi: 10.1117/12.883646.*
Runkle et al, "Securing special nuclear material: Recent advances in neutron detection and their role in nonproliferation," Journal of Applied Physics, 108, 11101 (2010).

(Continued)

*Primary Examiner* — David Porta
*Assistant Examiner* — Mindy Vu
(74) *Attorney, Agent, or Firm* — US Naval Research Laboratory; Rebecca L. Forman

(57) ABSTRACT

An enhanced neutron sensing device, that couples a gadolinium based scintillator with at least two wide bandgap photodiodes to achieve a high sensitivity, low power, and portable neutron detector with high gamma discrimination. Once coupled with electrical signal processing and read-out electrons, the device will output the incident neutron flux in the environment and can be used in locations with known sources of neutrons or for identifying clandestine nuclear materials.

22 Claims, 4 Drawing Sheets

(a)

(b)

(56) References Cited

OTHER PUBLICATIONS

Caruso, "The physics of solid-state neutron detector materials and geometries," J. Phys.: Condens. Matter, 22, 443201 (2010).
McGregor et al., "Perforated Semiconductor Neutron Detector Modules for Detection of Spontaneous Fission Neutrons," Technologies for Homeland Security, 2007 IEEE Conference on, 2007, pp. 162-167.
Glodo et al., "Mixed Lutetium Iodide Compounds," IEEE Transactions on Nuclear Science, vol. 55, No. 3, Jun. 2008.
McFee et al., "A Comparison of Fast Inorganic Scintillators for Thermal Neutron Analysis Landmine Detection," IEEE Transactions on Nuclear Science, vol. 56, No. 3, Jun. 2009.
Galunov et al., "Gd-Bearing Composite Scintillators as the New Thermal Neutron Detectors," IEEE Transactions on Nuclear Science, vol. 58, No. 1, Feb. 2011.
Salvato et al., "An apparatus for measuring the timing properties of scintillators for neutron imaging," Nuclear Instruments and Methods in Physics Research A, 621, 489-92 (2010).
Cress et al., "Modeling Laterally-Contacted nipi-Diode Radioisotope Batteries," IEEE Transactions on Nuclear Science, vol. 55, No. 3, 1736-43, Jan. 2008.
Peurrung, "Recent developments in neutron detection," Nuclear Instruments and Methods in Physics Research A, 443, 400-15 (2000).

\* cited by examiner

NEUTRON DETECTOR USING GD-BASED SCINTILLATOR AND WIDE-BANDGAP SEMICONDUCTOR PHOTOVOLTAIC

PRIORITY CLAIM

The present application is a non-provisional application claiming the benefit of U.S. Provisional Application No. 61/778,923, filed on Mar. 13, 2013 by Cory D. Cress, entitled "Neutron Detector using Gd-based scintillator and wide-bandgap semiconductor photovoltaic," the entire contents of which is incorporated herein by reference.

BACKGROUND OF THE INVENTION

Field of the Invention

The present invention relates generally to neutron detectors and, more specifically, to neutron sensing using a Gd-based scintillator coupled with two or more photodiodes.

Description of the Prior Art

Neutron sensing is an important task, which has implications across a wide range of modern societal needs, including global nuclear threat reduction. Neutron sensing is needed to assist in the identification and quantification of materials that possess neutron-emitting radioactive isotopes. More generally, there is also a need to quantify background neutron fluxes to accurately account for their effect on electronic devices, both transient and persistent effects alike. In today's integrated circuits (ICs) the density of devices has reached an all-time high, while the critical-charge upset-threshold continues to reduce. Thus, neutron-induced errors are an increasing issue for highly parallelized terrestrial computing applications as performed by data centers. Though limited in their interaction, neutrons, like most matter waves, are potentially harmful to humans making it important to quantify the flux of neutrons incident with humans working in environments that may lead to neutron exposure. In general, enhancements to the current state-of-the-art neutron sensing/detecting devices are highly sought after. Potential enhancements may result in performance improvements (sensitivity, dynamic range, energy resolution, gamma discrimination) or provide a rational means to overcome feasibility constraints (cost, power, size) and may have a wide or narrow range of applicability (e.g., background neutron sensing vs. neutron imaging of nuclear reactor cores).

A primary objective for neutron sensing is to enhance the efficiency and accuracy of identifying clandestine radioactive materials used in the production of nuclear weapons. Table 1 contains a list of common radioisotopes and the corresponding half-life, spontaneous fission rate, neutron emissions per fission event, and the number of neutrons per gram per second. The final column is the number of neutrons per cm$^2$ per second incident on a detector approximately 11.5 ft (3.5 m) away from 1 kilogram of the material; this configuration approximates the conditions within a shipping vessel (20 ft×8 ft×8 ft), with the source located in the center and the detector in a corner. These data exemplify a primary challenge of neutron sensing/detecting for nuclear threat reduction, namely, low signal intensities. Consequently, physical approaches (selection of materials, size of detectors, etc.,) along with engineering strategies (signal processing, maximizing signal-to-noise) are paramount to achieving the desired level of sensitivity.

TABLE 1

List of common radioisotopes used in the production of nuclear power and/or nuclear weapons.

| Isotope | Half-life (yr.) | Spont. fission per decay | Neutrons per fission | Neutrons/ kg-s | *Neutrons/ cm$^2$-s |
|---|---|---|---|---|---|
| 235U | $7.04 \times 10^8$ | $7.0 \times 10^{-11}$ | 1.86 | $1.0 \times 10^{-2}$ | $6.5 \times 10^{-9}$ |
| 238U | $4.47 \times 10^9$ | $5.4 \times 10^{-7}$ | 2.07 | 13.6 | $8.8 \times 10^{-7}$ |
| 239Pu | $2.41 \times 10^4$ | $4.4 \times 10^{-12}$ | 2.16 | 22.0 | $1.4 \times 10^{-6}$ |
| 240Pu | 6569 | $5.0 \times 10^{-8}$ | 2.21 | $9.2 \times 10^5$ | $6.0 \times 10^{-2}$ |

*The final column is the neutrons/cm$^2$s incident from 1 kg of material held at 3.5 m assuming a point source geometry and 10% isotopic purity.

Neutrons interact with matter very differently than other forms of radiation such as x-rays, gamma-rays, electrons (beta particles), or ions (including alpha particles). As electric-charge neutral particles, neutrons are unaffected by the negative electric charge of electrons or the positive electric charge of atomic nuclei. This allows them to pass through most materials with virtually no interaction or deflection. The three dominant mechanisms by which neutrons interact with sensing material are elastic scattering, inelastic scattering, and capture reactions. Each of these events are characterized by their corresponding event cross-section, $\sigma$ (also referred to as the differential cross section), which is the effective area within which a neutron, of a given energy, will be scattered or captured by the nucleus. Fissile neutrons (neutrons with high energy >1 MeV) interact with sensing material mainly through elastic scattering and to a lesser extent inelastic scattering, which can reach >10% of the elastic scattering cross section for heavy ions but is typically much less. To produce a measurable signal, scattering events must cause a displacement of the target nucleus; the interaction of this atom and the adjacent material is ultimately what generates the signal. Sensing fissile neutrons, therefore is challenging since elastic collisions result in a continuum of signal energies for neutrons above the threshold energy for atomic displacement, and no signal if the energy transferred by the neutron is below the threshold. In contrast, sensing of lower energy neutrons is made easier by the enhanced nuclear cross section associated with capture reactions. Moreover, capture reactions are inherently amplifying reactions as the resulting energy released is the sum of the incident neutron energy and the Q value of the reaction. Consequently, capture reactions yield reaction products that deposit a specific energy within the encompassing matter leading to characteristic signal features that are conducive to sensing.

Neutron sensing is fundamentally limited by the neutron cross-section of the neutron-sensing medium of the detector. Maximizing the neutron cross-section, mass density, and total volume are effective means to maximize detector efficiency. In particular, isotopes with large neutron cross sections are included in Table 2; thermal neutrons are neutrons with energies corresponding with ambient thermal energy (<0.026 eV).

TABLE 2

Thermal neutron cross section of commonly used neutron sensing isotopes.

| Isotope | Thermal Neutron Cross Section (b) |
|---|---|
| $^3$He | 5,330 |
| $^6$Li | 940 |

TABLE 2-continued

Thermal neutron cross section of commonly used neutron sensing isotopes.

| Isotope | Thermal Neutron Cross Section (b) |
| --- | --- |
| $^{10}$B | 3,840 |
| $^{157}$Gd | 255,000 |
| $^{235}$U | 585 |

A typical neutron event proceeds as $_0^1n+X \rightarrow Y+b$, where Y is the heavier ion which typically remains in the original lattice location, and b is of lower mass and emitted with an energy that corresponds with balance of the excess energy of the reaction. Similar to elastic scattering events, the electronic excitations caused by the emitted high-energy charged particle are what lead to a measurable response. The precise energy of the emitted particles of capture reactions, however, is much more conducive to pulse-shape discrimination techniques, leading to potentially higher efficiency and gamma discrimination.

The form in which energy is released by a neutron capture reaction has a large role in defining the subsequent detection mechanism used to generate a signal response. For instance, 157-Gd and 10-B neutron capture reactions proceed as follows:

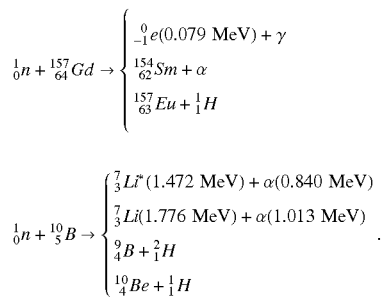

In both instances, the first reaction has the highest probability (>97% for neutrons with energies of <10 MeV) and is the only reaction considered here. The 79 keV beta-particle emitted in the 157-Gd reaction has a comparably smaller linear energy transfer rate (LET) in matter than heavier charged particles like the alpha particle and Li-ion emitted in the 10-B reaction. Furthermore, the long range of gamma-rays makes it possible for a fraction of the reaction energy to leave the detector entirely. This reduces the magnitude of the response and would broaden the energy response signal (a histogram counting the number of events within a given range signal amplitude [energy]). This example illustrates that maximizing the neutron cross section of the sensing material is only part of the neutron detector design challenge. Sensing the energy released by the reaction products (or the recoil atoms in the case of elastic collisions) is equally as critical and requires a particle specific device tailoring for maximum efficiency. In practice, many solid-state neutron detector approaches, sacrifice the larger neutron cross-section of 157-Gd for the more easily sensed reaction products of isotopes like 10-B and 6-Li, among others.

Directly sensing the effects of the reaction products (direct sensing of reaction products is effectively 2-step neutron sensing) as they transport through matter may be accomplished by any means that can separate and measure (count) the resulting excited electrons. In regards to solid-state devices, this is often achieved by using a semiconductor diode comprised of a p-type semiconductor adjacent to an n-type semiconductor. In these devices, the internal field of the diode separates carriers and outputs a current that is proportional to the total energy lost by the reaction products of the nuclear event within the active region. The active region being the region of the device in which energy deposited (of sufficient magnitude) has a measurable effect. All other regions are considered dead space. Charge coupled devices (CCDs) are effective at counting charges that becomes stored in a floating dielectric material—the active region. Arrays of these structures may be used to increase the sensing area, or under large neutron fluxes, be used to generate neutron images. Recently, static random access memory (SRAM) devices have been used to count the number of reaction products with sufficient energy to cause a bit-flip to occur. Once flipped, the neutron event becomes stored indefinitely in the memory allowing periodic sampling to take place on the detector at a later time. Dosimetry type approaches using metal-oxide-semiconductor (MOS) based transistors rely on the reaction products to create a population of trapped charges in the gate dielectric layer. The trapped charges shift the MOS transistor transfer characteristics leading to a measurable response that, once calibrated, provides a measure of the total number of incident neutrons received.

In general, direct-conversion solid-state neutron sensors and dosimeters rely on reaction products that transit through and deposit a critical amount of energy within the active region of the device to register a neutron absorption event. Therefore, close proximity of the neutron sensing material with the active region is important for maximizing the neutron signal. The maximum range of typical reaction products, e.g., alpha or beta particles, is less than 100 μm (5 MeV alphas have a range of 24.2 μm in Si). Therefore, an optimal thickness of the sensing material balances the need to increase the thickness to maximize neutron absorption with the requirement that the reaction product must reach the active region. For thicknesses of this scale, incomplete absorption of the incident neutron flux may occur, which reduces the intrinsic efficiency of the device.

Many novel device structures have been proposed to circumvent the geometric losses. Regarding diode-based detectors, the planar geometry device design is altered through various means to form two-dimensional and three-dimensional structures that aim to simultaneously maximize sensing-material volume while minimizing the average distance from the sensing material to the active region. Other approaches incorporate large-neutron cross section elements within the solid-state converter, which has the potential to increase the intrinsic neutron detection efficiency to unity. In general, these approaches are hindered by lower quality materials and subsequently lower efficiency devices. The goal of these neutron detectors is to mitigate the geometric losses while maintaining the favorable form factor, low-cost (comparably), and low-power attributes of devices based on solid-state converters.

Scintillators, crystals that luminesce under exposure to ionizing radiation including alpha, beta, x-ray, gammas, etc., provide an alternative strategy for neutron detection. Scintillator crystals have been extensively used in nuclear science because of their ability to absorb ionizing radiation and rapidly convert it to light which is conducive to measurement via photodiodes, photomultipliers, microchannel plates, etc. Scintillators act as particle amplifiers by converting the energy emitted from a single ionizing particle into 100s to 1000s of photons. Highly efficient crystals can exceed 100,000 photons per 1 MeV of incident ionizing radiation. Therefore, a neutron capture reaction with Q=5 MeV can have an effective neutron-to-photon quantum yield ($\eta_{n \to hv}$) in excess of 100,000, depending on the LET and range of the reaction product. With a low noise, high-speed detector, the scintillator emission output signal can be calibrated to provide the precise energy of the sensed particle, and using pulse-shape discrimination techniques, identify the specific nature of the particle (i.e., neutron, gamma, x-ray, beta, alpha, etc.). Integrating isotopes with large neutron cross sections, such as 6-Li, 10-B, and 157-Gd is important to sensitizing scintillators to neutron fluxes. A recent work reports exceptional light output, rise time, and decay time for Lutetium gadolinium halides doped with Ce. Typical light output, rise times, and decays times were 80,000 photons/MeV, <1 ns, and <50 ns, respectively making the material applicable to neutron sensing and pulse-shape discrimination techniques. (Glodo et al., "Mixed Lutetium Iodide Compounds," *Nuclear Science, IEEE Transactions on*, 55, 3 1496-1500 (2008) and U.S. Pat. No. 7,755,054 (2008)).

Typical detection methods utilize fast photomultiplier tubes (PMTs), photodiodes, or microchannel plates to sense the photons emitted from a scintillator crystal. These devices are subsequently connected to additional electrical analyzers, such as a multichannel analyzer (MCA) for pulse-shape analysis, or directly to an instrument for voltage/current read-out. Advances in digital electronics have enabled a significant reduction in the size and power necessary to process the scintillator output. Handheld, battery operated MCAs are commercially available. However, PMT based sensing approaches remain unfavorable because of the high voltages and size of the tube. Conversely, solid-state based sensing devices are highly scalable, making them amenable to standalone, battery powered operation. However, solid-state devices based on Si photodiodes (PIN diodes) are inherently limited in speed and leakage current due to the long lifetime and relatively narrow bandgap of Si. Silicon avalanche photodiodes improve the lifetime and leakage current but at the price of much larger biases ranging from 10-100 V. Furthermore, devices based on Si have a very strong temperature dependence which increases the dark current by an order of magnitude for every 10° C. The key to achieving a low-power, low-noise, temperature independent nuclear detector is to utilize high efficiency photodiodes based on wide bandgap semiconductors that are operated in (unbiased) photovoltaic mode.

BRIEF SUMMARY OF THE INVENTION

The aforementioned problems are overcome in the present invention which provides a neutron detector having a Gd-based scintillator coupled with two or more wide bandgap photodiodes and signal processing electronics to maximize neutron sensing and gamma ray discrimination. Also disclosed is the related method for detecting neutrons.

The invention describes an enhanced neutron sensing device. This device couples a gadolinium based scintillator with a wide bandgap photodiode to achieve a high sensitivity, low power, and portable neutron detector with high gamma discrimination. Once coupled with electrical signal processing and read-out electrons, the device will output the incident neutron flux in the environment and can be used in locations with known sources of neutrons or for identifying clandestine nuclear materials.

These and other features and advantages of the invention, as well as the invention itself, will become better understood by reference to the following detailed description, appended claims, and accompanying drawings.

BRIEF DESCRIPTION OF THE DRAWINGS

FIG. 1(*b*) is an overlay of the InGaP$_2$ spectral responsivity (line with dots) and the characteristic emission spectrum of Eu$^{3+}$ doped phosphors.

FIG. 3(*b*) shows simulated radioisotope battery power output of the three devices under an excitation source that yields a generated current of 10 µA/cm$^2$—Si, 1 µA/cm$^2$—GaAs and InGaP$_2$. A larger generated current is assumed in the Si cell because it has a greater generation volume, although 10× more current is a very generous assumption.

DETAILED DESCRIPTION OF THE INVENTION

The present invention is aimed at the development of battery operated, high efficiency, low-power solid-state neutron detectors with high gamma discrimination. In the ideal instantiation of the device, a 157-Gd enriched rare-earth activated single-crystal or transparent nano-crystalline Gd-based scintillator is paired with high-efficiency low-noise InGaP$_2$ solid-state detectors with signal processing circuitry. Single-crystal or nano-crystalline Gd-based scintillators and back-end signal processing electronics are used to maximize neutron sensitivity and gamma ray discrimination by reducing internal scattering of the generated photons.

Figure 1:
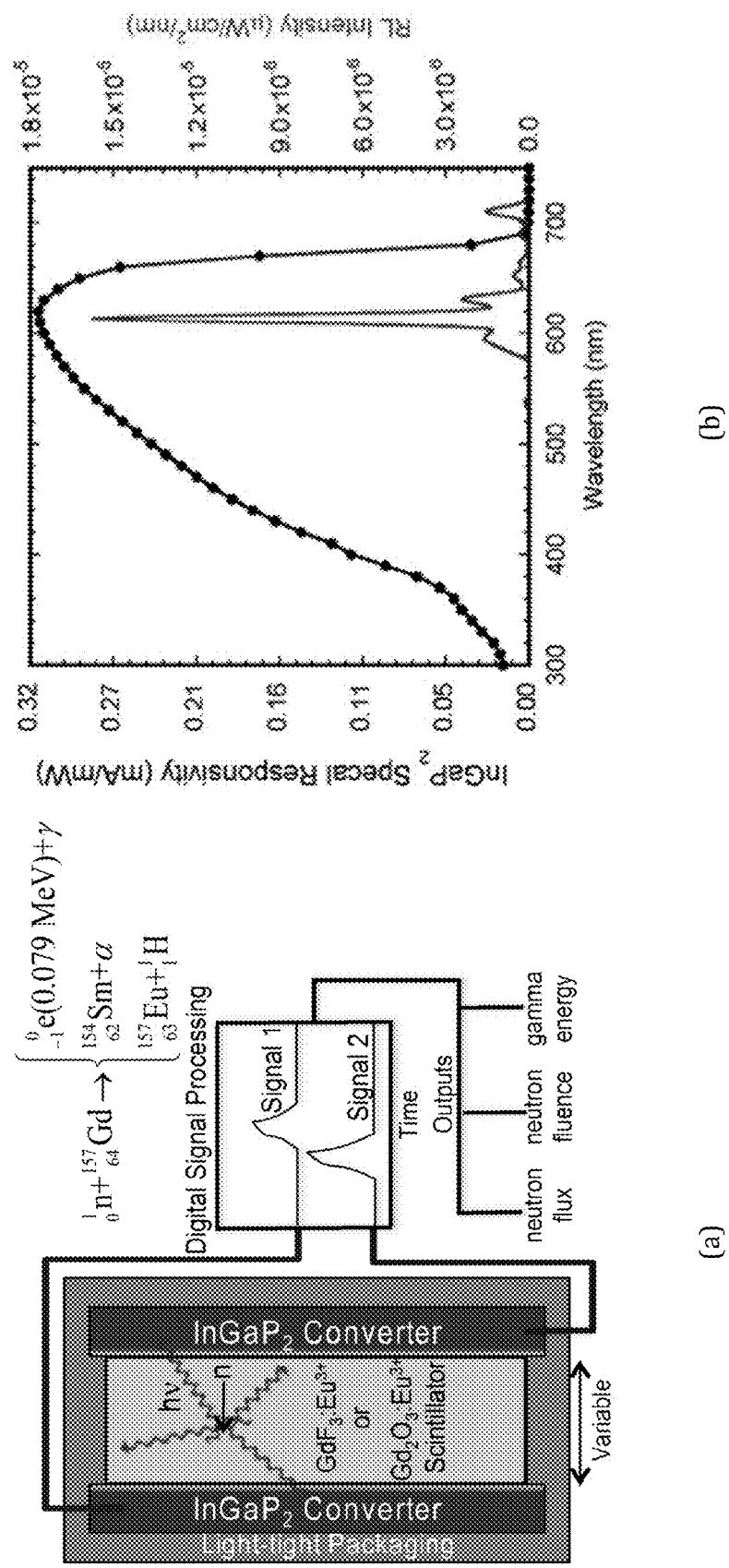
FIG. 1(*a*) is a schematic of the neutron detector structure and operating mechanisms.

The neutron detection technology of the present invention combines the favorable aspects of direct-conversion solid-state detection technologies (low power, scalability, low cost, high gamma discrimination, etc.) with the largest-know thermal neutron cross section of 157-Gd. FIG. 1(*a*) provides a schematic representation of the detector and operating mechanism. First, neutrons are absorbed by Gd in the Gd-based scintillator, which results in the emission of the nuclear reaction products. As shown on the right inset, the reaction products of 157-Gd include a 79 keV electron and gamma ray or, with much lower probability, an alpha particle or proton can be emitted. Regardless of the reaction, all of the reaction products (electrons, alphas, or protons) of 157-Gd (or other Gd isotopes) have sufficient energy to ionize the surrounding scintillator, which subsequently converts the energy to photons. The emitted photons propagate through the scintillator to one of two adjacent InGaP$_2$ photovoltaic devices that convert the optical signal into a proportional electrical signal. Europium is currently specified as the scintillator dopant (or activator) because of the ideal match to the peak spectral responsivity of the InGaP$_2$ converter. However, the Gd-based scintillators may include GdF$_3$, Gd$_2$O$_3$, GdI$_3$, GdBr$_3$, or GdCl$_3$, and other rare-earth dopants (Ce, Tb, Er, Tm) as well as co-doping may also be considered for the purposes of increased density, faster (or slower) luminescence lifetimes, ease of crystal production, etc. The light output $$\left(\Phi_p = \frac{S(E)}{E_g}\eta_{RL},\right.$$

where $$S(E) = \int^R \frac{dE}{dx}(E)dx$$

dx is the total ionizing energy deposited over the range, R, of the particle with initial energy E, $E_g$ is the bandgap energy of the scintillator, and $\eta_{RL}$ is the radioluminescent efficiency, of the scintillator) can exceed 6000 photons/n in Gd-based scintillators with Ce doping. This would result in a photon power intensity of $P=\Phi_p h\nu/t=0.19$ nW/neutron, where t=10 µs is included as a conservative estimate of the pulse width. This amount of incident optical power is well above the minimum sensitivity for InGaP$_2$ photovoltaic converters, meaning this technology can be used for real-time single neutron counting. FIG. 1(b) is an overlay of the InGaP$_2$ spectral responsivity (line with dots) and the characteristic emission spectrum of Eu$^{3+}$ doped phosphors. (Cress et al., "Alpha-particle-induced luminescence of rare-earth-doped Y$_2$O$_3$ nanophosphors," *Journal of Solid State Chemistry*, 181(8), 2041-45 (2008)).

Following amplification, the output current pulse from the InGaP$_2$ devices could potentially serve as a direct signal output of the detector. However, the scintillator crystal and InGaP$_2$ converters may also have an unwanted sensitivity to background gamma radiation in the environment. Signal processing techniques assessing the timing, shape, and amplitude of incident signals, from both InGaP$_2$ converters, will be applied to discriminate neutrons from the background gamma events with high efficacy. Depending on the intended application, both full spectrum energy resolved data may be provided using multiple channel pulse high signal processing or miniaturized versions that provide single channel resolution (single energy) but with reduced mass and energy overhead for using in unattended sensing applications.

Figure 2:
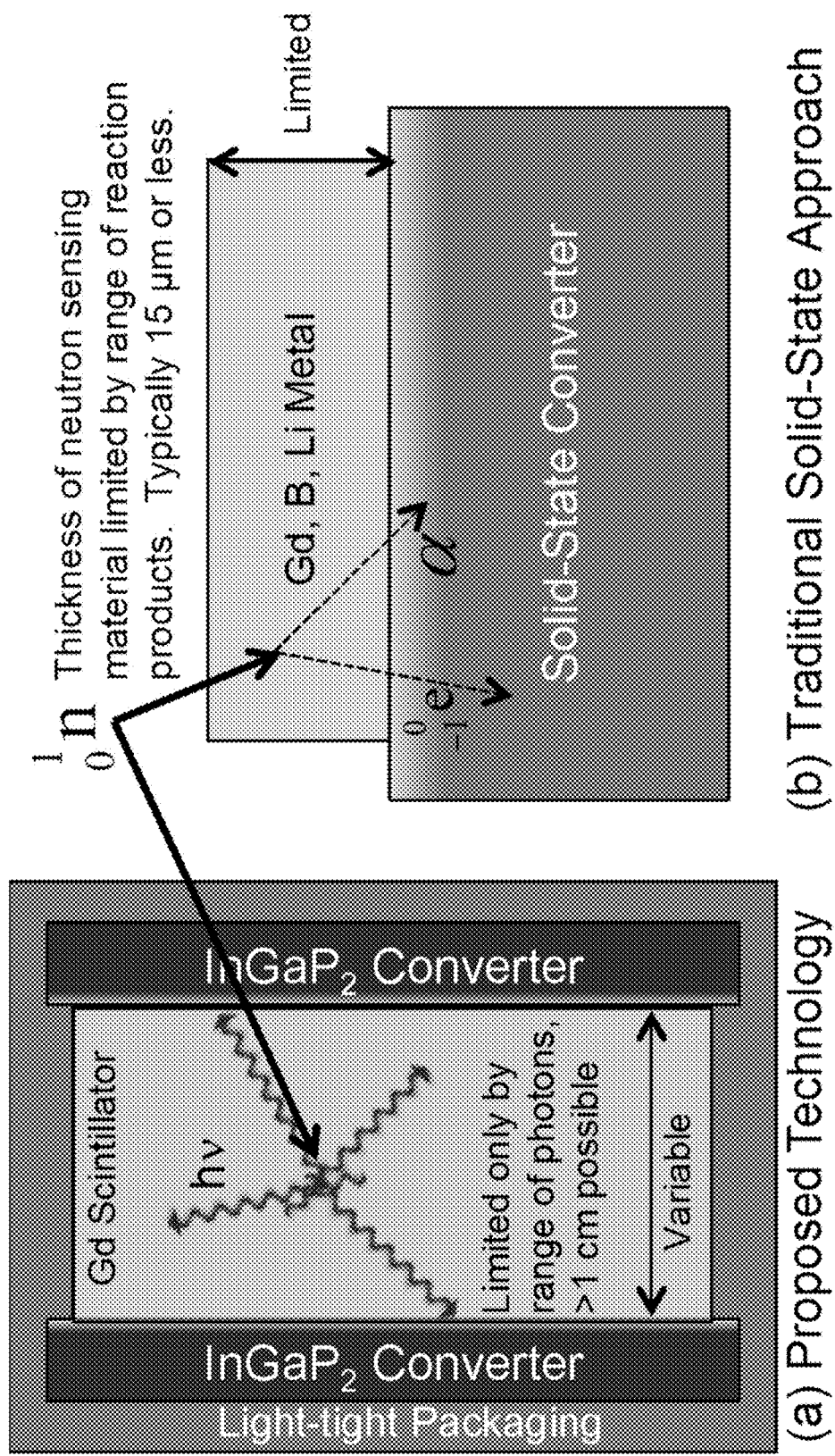
FIG. 2 is a comparison of limitations on the neutron absorption cross section for (a) the present invention and (b) traditional solid-state approaches.

FIG. 2 provides a comparison of the limitation on neutron sensitive layer thickness for the present invention and alternative solid state approaches. In the present invention, the limiting thickness of the Gd-based scintillator is defined by the range of the emitted photons from the crystal, which can be greater than 1 cm for high quality crystalline material. In contrast, solid state detectors based on direct-ionization are limited by the range of the nuclear reaction products, which for low energy electrons and alpha-particles is typically 15 µm or less. For a given neutron flux, the maximum sensitivity is dictated by the total cross section of neutron absorbing material (i.e., the Gd-based crystal). Therefore, the size of the Gd-based scintillator crystal employed can be used to tune the sensitivity of the detector to the desired level for the given application. For hand-held operation, a device that has adjustable crystal sizes for real-time sensitivity tuning is conceivable, and would be ideal for environments where large variations in neutron fluxes are possible.

Detector

The detector envisioned for this invention is based on InGaP$_2$, which has many favorable qualities as compared to more traditional solid-state photodiodes. Some advantages of InGaP$_2$ photodiodes include an extremely low dark current, high absorption coefficient, short lifetime, and thin active volume. These attributes yield photodiodes that can be operated in photovoltaic mode and achieve high-speed and high sensitivity while requiring very low power. For enhanced sensitivity and speed, the devices may also be operated in photosensing mode. In all modes, the thin active volume allows for high gamma discrimination.

Figure 3:
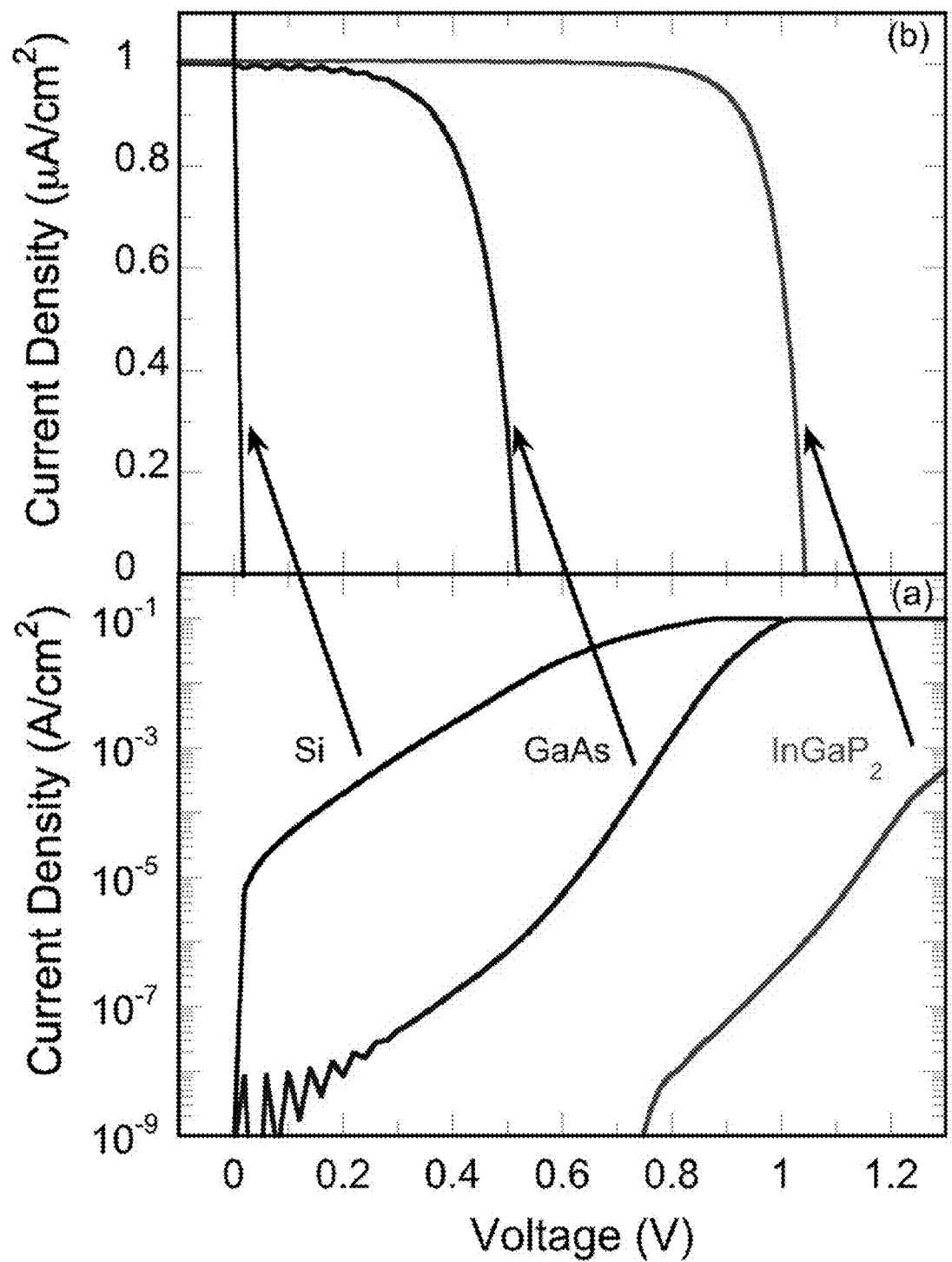
FIG. 3(*a*) shows measured dark current density vs. voltage characteristics for Si, GaAs, and InGaP$_2$ photovoltaic device.

InGaP$_2$, a wide bandgap semiconductor, is useful over more traditional photodiode materials, including Si and GaAs, as shown in FIG. 3. FIG. 3(a) depicts the measured current density—voltage characteristics for the three devices under dark conditions. Under operation, the dark current flows in opposition to the scintillation-generated current, thus it is an unwanted source of leakage within the device. For high sensitivity, an important factor is the shunt resistance, i.e., the ability to oppose current flow through the device under low (near zero) biasing conditions when the photodiode is nominally considered to be in the off state. Since resistivity depends on the carrier density of a material, the high bandgap and concomitantly low intrinsic carrier concentration of InGaP$_2$ yield a shunt resistance that is 3-5 orders of magnitude larger than GaAs and 5-7 orders of magnitude larger than Si. The much lower (off the scale in FIG. 1(a)) zero-bias current density for the InGaP$_2$ device is evidence of this attribute. Furthermore, the lower intrinsic carrier concentration also reduces the saturation current, which effectively downward shifts the magnitude of the dark current.

The impact of the lower dark current on the power output of a RPC is illustrated in FIG. 3(b) by simulating a large optical pulse emitted from the scintillator, resulting in a current that flows in the device opposite to the dark current (the current axis has been inverted to plot the result in the first quadrant). This method is called the linear superposition method and is often performed to simulate the power output of photovoltaic devices under optical excitation. A pulse 10× larger was assumed for the Si cell to emphasize the point, resulting in generated currents of 10 µA/cm$^2$ (Si) and 1 µA/cm$^2$ for both the GaAs and InGaP$_2$ devices. Under these conditions, the Si device is not capable of generating a photo-voltage since the dark current is greater than the generated current. For the GaAs and InGaP$_2$ devices a short circuit current density of ~1 µA/cm$^2$ is achieved since at zero bias the dark current in both devices is 1 nA/cm$^2$ or less. The larger shunt resistance in these devices is the main contributor in the stark contrast between the performance of Si and the other two devices. This results in an output voltage of 0.52 V and 1.05 V for the GaAs and InGaP$_2$ photodiodes, respectfully. Following a similar analysis, the output voltage of the InGaP$_2$ photodiode would exceed 0.75 V under excitation by a 1 nA/cm$^2$ pulse and is over 0.5 V under excitation by a 0.1 nA/cm$^2$ pulse. The latter could be generated by a single neutron capture reaction of 157-Gd as a part of a GdI$_3$:Ce scintillator crystal which has a photon yield of over 6000 photons.

Figure 4:
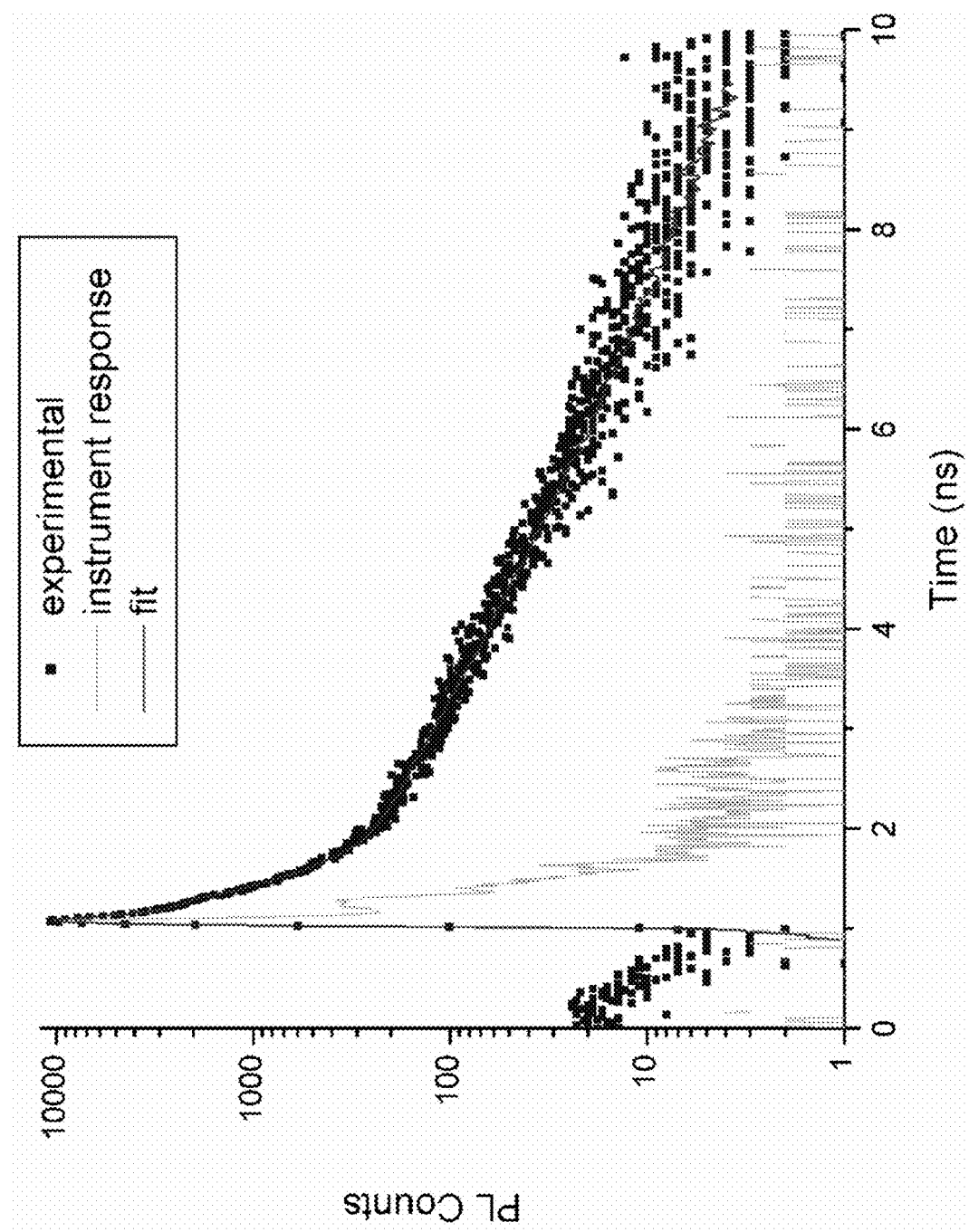
FIG. 4 shows photoluminescence transient of InGaP$_2$ epitaxially layer (squares) overlaid with the instrumental response and a parametric fit to the data.

The speed of the InGaP$_2$ photodiodes is an important consideration and necessary to apply pulse-shape analysis techniques. FIG. 4 depicts the time-resolved photoluminescence measurements conducted on a high quality epitaxially grown InGaP$_2$ layer. The experimental data (squares) show a fast initial decay followed by a long-lived lifetime component. The time constant of the fast component is ~74 ps, while the long-lived is 3-4 ns. In comparison, the lifetime of Si typically exceeds 1 µs because it is an indirect semiconductor. This information supports the notion that extremely fast photodiodes can be developed from InGaP$_2$.

The design and fabrication of the InGaP$_2$ photodiodes also draws important distinctions with other materials. As a direct bandgap III-V semiconductor, InGaP$_2$ has an extremely high absorption coefficient allowing it to absorb >98% of incident light (with a wavelength of 650 nm or less) in less than 3 µm. When operated in photovoltaic mode (no external bias), the carriers have an extremely short path to transit for collection enabling high speed operation in photovoltaic mode. By introducing a doping gradient in the base of the structure, a built in field can be generated that drives the minority carriers to their respective sides of the diode further speeding the device. For operation in photo-sensing mode (an externally supplied reverse bias applied), even greater speed and sensitivity may be achieved because carriers are driven out of the device. To further suppress dark current and increase shunt resistance, a thin intrinsic region may be grown within the structure forming a p-type-intrinsic-n-type (PIN) structure. For comparison, Si photodiodes and avalanche photodiodes rely on absorption by Si which is an indirect semiconductor with a much lower absorption coefficient. Therefore, to achieve full absorption, the photodiode structures use the entire thickness of the Si wafer (100 µm to 300 µm thick). Therefore, the transit time for generated carriers is 30 to 100 times longer for these devices necessitating a tradeoff between device speed and sensitivity since thinner faster devices have less absorption. Furthermore, the large absorption cross section in Si-based photodiodes increases their susceptibility to false counts from incident background radiation such as gamma rays and x-rays. This effect is even worse in Si avalanche photodiodes (APDs), which have an internal gain mechanism. The >3 µm cross section of InGaP$_2$ greatly suppresses this effect making it more applicable for applications that necessitate high gamma discrimination.

Scintillator

The present invention is not restricted to the halides, crystals formed from rare-earth doped Gd$_2$O$_3$; and those that incorporate Li, such as Gd$_{(x)}$Li$_{(1-x)}$F$_3$ would also be applicable. Essentially any Gd-based scintillator with a high photon yield under neutron exposure is applicable. An ideal scintillator would be one comprising isotopically enriched 157-Gd to maximize the thermal neutron cross section, has a photon yield exceeding 6000 photons/neutron (ideally 12,000 photons/neutron), and emission wavelength near 610 nm, and has an emission lifetime of 50 ns or less.

For the present invention, a non-Gd scintillator may be used in addition to a Gd-based scintillator. The non-Gd scintillator can serve as a background reference to help gamma discrimination. Also, the non-Gd scintillator may be used in combination with a Gd-based scintillator to determine the source of the radiation, meaning that the actual isotope emitting the neutrons and gammas can be identified.

Assembled Device

The compilation of fast InGaP$_2$ diodes, neutron sensitive Gd-based scintillators, and pulse-shape signal analysis techniques yields a truly unique neutron-sensing device. Some advantages of the device are its low-power, small size, and potentially reduced cost as compared to state-of-the-art detectors based on 3-He ionization counters or photomultiplier tube coupled scintillator approaches. The device uses a Gd-based scintillator bi-facially coupled with two (or more) InGaP$_2$ photodiodes. This multi-diode coupling enables coincidence signal processing to be performed on output signals from the photodiodes allowing for improved suppression of background signals resulting from gamma rays incident with the scintillator or one of the photodiodes. Finally, the use of InGaP$_2$ photodiodes enables the device to operate in photovoltaic mode while still achieving high sensitive and speed. This operation is important for achieving low power operation in a standalone device.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

The invention claimed is:

1. A neutron detector, comprising:
   a 157-Gd isotopically enriched dopant-activated single-crystal or nano-crystalline Gd-based scintillator coupled with two or more wide bandgap epitaxially grown photodiodes, wherein:
      the scintillator has a photo yield exceeding 6000 photons/neutron and an emission lifetime of 50 ns or less;
      each photodiode has a shunt resistance that is 3-5 orders of magnitude larger than GaAs and 5-7 orders of magnitude larger than Si;
      each photodiode has a dark current, at zero bias, of 1 nA/cm$^2$ or less;
      each photodiode has an output voltage greater than 0.75 V under excitation by a 1 nA/cm$^2$ pulse and greater than 0.5 V under excitation by a 0.1 nA/cm$^2$ pulse;
      each photodiode absorbs greater than 98% of incident light with a wavelength of 650 nm or less in less than 3 microns;
      each photodiode has a base doping gradient that generates a built in field that drives minority carriers to respective sides of the photodiode; and
      each photodiode has a cross section thickness of less than or equal to 3 microns; and
   signal processing electronics configured to perform pulse-shape, coincidence signal analysis that assesses timing, shape, and amplitude of incident signals generated by the two or more photodiodes to achieve neutron sensing and gamma ray discrimination.

2. The neutron detector of claim 1, wherein the photodiodes comprise InGaP$_2$.

3. The neutron detector of claim 1, wherein the Gd-based scintillator comprises GdF$_3$, Gd$_2$O$_3$, GdI$_3$, GdBr$_3$, GdCl$_3$, or Gd$_{(x)}$Li$_{(1-x)}$F$_3$ and a scintillator dopant.

4. The neutron detector of claim 1, wherein a scintillator dopant comprises Eu, Ce, Tb, Er, Tm, or any combination thereof.

5. The neutron detector of claim 1, wherein the detector comprises a single-crystal Gd-based scintillator.

6. The neutron detector of claim 1, wherein the photodiodes operate in photovoltaic mode.

7. The neutron detector of claim 1, wherein the photodiodes operate in photosensing mode.

8. The neutron detector of claim 1, additionally comprising a non-Gd based scintillator configured to serve as a background reference to help gamma discrimination and to determine a source of radiation.

9. The neutron detector of claim 1, wherein the detector comprises a nano-crystalline Gd-based scintillator.

10. The neutron detector of claim 1, wherein the detector has one or more of the following features:
   (1) the scintillator is rare-earth activated;
   (2) the scintillator has a thickness greater than 1 cm;

(3) the scintillator has an emission wavelength near 610 nm;

(4) each photodiode has a time constant having a fast component of about 74 ps and a long-lived component of 3-4 ns; and (5) each photodiode has an intrinsic region forming a p-type-intrinsic-n-type (PIN) structure.

11. The neutron detector of claim 10, wherein the detector has all of the features (1)-(5).

12. A method for detecting neutrons, the method comprising:

generating incident signals using a neutron detector comprising a 157-Gd isotopically enriched dopant-activated single-crystal or nano-crystalline Gd-based scintillator coupled with two or more wide bandgap epitaxially grown photodiodes, wherein:

the scintillator has a photo yield exceeding 6000 photons/neutron and an emission lifetime of 50 ns or less;

each photodiode has a shunt resistance that is 3-5 orders of magnitude larger than GaAs and 5-7 orders of magnitude larger than Si;

each photodiode has a dark current, at zero bias, of 1 $nA/cm^2$ or less;

each photodiode has an output voltage greater than 0.75 V under excitation by a 1 $nA/cm^2$ pulse and greater than 0.5 V under excitation by a 0.1 $nA/cm^2$ pulse;

each photodiode absorbs greater than 98% of incident light with a wavelength of 650 nm or less in less than 3 microns;

each photodiode has a base doping gradient that generates a built in field that drives minority carriers to respective sides of the photodiode; and each photodiode has a cross section thickness of less than or equal to 3 microns; and processing the incident signals from the photodiodes using signal processing electronics configured to perform pulse-shape, coincidence signal analysis that assesses timing, shape, and amplitude of the incident signals to achieve neutron sensing and gamma ray discrimination.

13. The method of claim 12, wherein the photodiodes comprise $InGaP_2$.

14. The method of claim 12, wherein the Gd-based scintillator comprises $GdF_3$, $Gd_2O_3$, $GdI_3$, $GdBr_3$, $GdCl_3$, or $Gd_{(x)}Li_{(1-x)}F_3$ and a scintillator dopant.

15. The method of claim 12, wherein a scintillator dopant comprises Eu, Ce, Tb, Er, Tm, or any combination thereof.

16. The method of claim 12, wherein the detector comprises a single-crystal Gd-based scintillator.

17. The method of claim 12, wherein the detector comprises a polycrystalline Gd-based scintillator.

18. The method of claim 12, wherein the photodiodes operate in photovoltaic mode.

19. The method of claim 12, wherein the photodiodes operate in photosensing mode.

20. The method of claim 12, wherein the detector further comprises a non-Gd based scintillator configured to serve as a background reference to help gamma discrimination and to determine a source of radiation.

21. The method of claim 12, wherein the detector has one or more of the following features:

(1) the scintillator is rare-earth activated;

(2) the scintillator has a thickness greater than 1 cm;

(3) the scintillator has an emission wavelength near 610 nm;

(4) each photodiode has a time constant having a fast component of about 74 ps and a long-lived component of 3-4 ns; and (5) each photodiode has an intrinsic region forming a p-type-intrinsic-n-type (PIN) structure.

22. The method of claim 21, wherein the detector has all of the features (1)-(5).

* * * * *